US011175306B2

(12) United States Patent
Marohn et al.

(10) Patent No.: US 11,175,306 B2
(45) Date of Patent: Nov. 16, 2021

(54) ATOMIC FORCE MICROSCOPY APPARATUS, METHODS, AND APPLICATIONS

(71) Applicant: CORNELL UNIVERSITY, Ithaca, NY (US)

(72) Inventors: John Marohn, Ithaca, NY (US); Sarah Nathan, Ithaca, NY (US); Ryan Dwyer, Pewaukee, WI (US)

(73) Assignee: CORNELL UNIVERSITY, Ithaca, NY (US)

(*) Notice: Subject to any disclaimer, the term of this patent is extended or adjusted under 35 U.S.C. 154(b) by 0 days.

(21) Appl. No.: 16/612,473

(22) PCT Filed: May 10, 2018

(86) PCT No.: PCT/US2018/032081
§ 371 (c)(1),
(2) Date: Nov. 11, 2019

(87) PCT Pub. No.: WO2018/209099
PCT Pub. Date: Nov. 15, 2018

(65) Prior Publication Data
US 2020/0204112 A1 Jun. 25, 2020

Related U.S. Application Data

(60) Provisional application No. 62/504,026, filed on May 10, 2017.

(51) Int. Cl.
G01Q 30/00 (2010.01)
G01Q 60/30 (2010.01)
G01Q 60/48 (2010.01)

(52) U.S. Cl.
CPC ............. *G01Q 30/00* (2013.01); *G01Q 60/30* (2013.01); *G01Q 60/48* (2013.01)

(58) Field of Classification Search
CPC ........ G01Q 60/30; G01Q 30/00; G01Q 60/48; G01Q 10/045
See application file for complete search history.

(56) References Cited

U.S. PATENT DOCUMENTS 5,436,448 A    7/1995   Hosaka et al.
6,073,485 A *   6/2000   Kitamura ............... G01Q 60/30
                                                    73/105

(Continued)

FOREIGN PATENT DOCUMENTS

JP    2016023952    2/2016

OTHER PUBLICATIONS

Schumacher, Zeno, et al. "Measurement of surface photovoltage by atomic force microscopy under pulsed illumination." Physical Review Applied 5.4 (2016): 044018. (Year: 2016).*

(Continued)

*Primary Examiner* — Wyatt A Stoffa
(74) *Attorney, Agent, or Firm* — Blaine Bettinger

(57) ABSTRACT

Atomic force microscopy apparatus and method that enable observing charge generation transients with nanometer spatial resolution and nanosecond to picosecond time resolution, the timescale relevant for studying photo-generated charges in the world's highest efficiency photovoltaic films. The AFM apparatus includes an AFM, a light source for illumination of a sample operatively coupled to the AFM, a voltage source operatively coupled to the AFM, and a control circuitry operatively coupled to the light source and the voltage source. The AFM apparatus improves the time resolution and enables rapid acquisition of photocapacitance transients in a wide array of solar-energy-harvesting materials.

16 Claims, 6 Drawing Sheets

(56) References Cited

U.S. PATENT DOCUMENTS

| | | | | |
|---|---|---|---|---|
| 7,944,550 | B2* | 5/2011 | Bumm | G01B 21/32 |
| | | | | 356/32 |
| 8,418,538 | B2* | 4/2013 | Dazzi | B82Y 35/00 |
| | | | | 73/105 |
| 2012/0050718 | A1* | 3/2012 | Dazzi | G01N 21/3563 |
| | | | | 356/51 |
| 2012/0079630 | A1* | 3/2012 | Ginger | G01Q 60/30 |
| | | | | 850/1 |
| 2012/0260374 | A1 | 10/2012 | McConney | |
| 2013/0085714 | A1* | 4/2013 | Itoh | G01Q 60/30 |
| | | | | 702/150 |
| 2013/0276174 | A1* | 10/2013 | Li | G01Q 20/02 |
| | | | | 850/6 |
| 2014/0310839 | A1 | 10/2014 | Wickramasinghe | |
| 2015/0253354 | A1* | 9/2015 | Giraudet | G01B 11/30 |
| | | | | 850/18 |
| 2016/0178659 | A1* | 6/2016 | Li | G01Q 20/00 |
| | | | | 850/38 |
| 2016/0294323 | A1* | 10/2016 | Borowik | G01Q 60/30 |
| 2018/0136252 | A1* | 5/2018 | Bordain | G01Q 60/30 |
| 2020/0049735 | A1* | 2/2020 | Albrecht | G01Q 30/18 |

OTHER PUBLICATIONS

Karatay, Durmus U., et al. "Fast time-resolved electrostatic force microscopy: Achieving sub-cycle time resolution." Review of Scientific Instruments 87.5 (2016): 053702 (Year: 2016).*

International Search Report and Written Opinion for International Application No. PCT/US2018/032081 dated Aug. 2, 2018; 11 pages.

* cited by examiner

ATOMIC FORCE MICROSCOPY APPARATUS, METHODS, AND APPLICATIONS

CROSS REFERENCE

This application is a U.S. National Phase filing of International Application No. PCT/US18/32081 filed May 10, 2018, which itself relates and claims priority to U.S. Provisional Patent Application Ser. No. 62/504,026, filed May 10, 2017, the contents of each of which is hereby incorporated by reference in its entirety.

GOVERNMENT FUNDING

This invention was funded by the National Science Foundation under project IDs DMR-1309540 and DMR-1006633. The U.S. government has certain rights in the invention.

BACKGROUND OF THE INVENTION

1. Field of the Invention

The invention relates generally to atomic force microscopy and more particularly, to a system and method for measuring photocapacitance using scanned probe microscopy.

2. Description of Related Art

Currently, it is unsettled how light is converted to electricity in blends of organic donor and acceptor molecules. The spatial heterogeneity present in these blends makes it challenging to characterize. Scanned-probe measurements have provided crucial microscopic insights into charge generation and transport in these blends. However, it has been difficult to achieve nanosecond time resolution needed to directly observe the fate of photogenerated charges in organic photovoltaic (OPV) materials.

One current method which attempts to address high-speed time resolution is time-resolved microwave conductivity (TRMC). TRMC measures the charge-creation yield and charge recombination rate in semiconductor films prepared on insulating substrates with 10 ns time resolution. TRMC has been used to measure the charge-creation yield in a series of derivatized fullerenes dissolved at low concentration into a polymer film.

Another current method is time resolved electric force microscopy (tr-EFM), which measures photocapacitance transients on the microsecond timescale. In tr-EFM, a light pulse is sent to a semiconductor sample. The photocapacitance rise time is observed as a transient change in the oscillation frequency of the charged microcantilever, determined by demodulating the digitized cantilever oscillation data.

In another method, fixed-frequency and fast-free time-resolved electrostatic force microscopy (FF-tr-EFM) is used to detect sub-microsecond photocapacitance changes. In FF-tr-EFM, the cantilever oscillation is digitized, filtered and demodulated to extract $t_{FP}$, the time at which the cantilever frequency reaches a minimum. An empirical calibration step is required to relate the measured $t_{FP}$ to the sample's underlying photocapacitance rise time. This empirical calibration step reduces the entire photocapacitance transient to a single number, $t_{FP}$. Moreover, time resolution is still limited by the detector bandwidth since neither FF-tr-EFM is a true indirect measurement.

Finally, ultrafast indirect scanning tunneling microscopy (STM) measurements have demonstrated ns to ps time resolution on gallium arsenide, but lack the clear connection to organic solar cell performance demonstrated with tr-EFM. While indirect Kelvin probe force microscopy methods can measure surface potential changes with picosecond time resolution, these measurements exploit the nonlinear dependence of photovoltage on light intensity and/or the nonlinear dependence of the cantilever frequency $f_c$ on photovoltage or assume the tip voltage passively observes sample properties. Unfortunately, because photocapacitance generally depends linearly on light intensity, produces a linear charge in $f_c$, and depends strongly on tip voltage, the ultrafast methods of STM are not applicable to blends of organic donor and acceptor molecules.

Therefore, there is a need for a system and method for improving the time resolution of electric force microscopy, enabling rapid acquisition of photocapacitance transients in solar-cell films.

SUMMARY OF THE INVENTION

The present invention is directed to, inter alia, a system and method for measuring photocapacitance or polarization transients with high temporal resolution. In one embodiment, the present invention is an atomic force microscope (AFM) apparatus. The AFM apparatus includes an AFM, a light source for illumination of a sample operatively coupled to the AFM, a voltage source operatively coupled to the AFM, and a control circuitry operatively coupled to the light source and the voltage source.

In one embodiment, the present invention is a system for measuring the time-evolution of charge or polarization induced by light in a sample. The system includes an AFM having: (i) a control circuitry, (ii) a cantilever with a tip located at a known height above the sample; (iii) a drive mechanism operatively coupling the cantilever and the control circuitry; (iv) a laser configured to emit light at the tip of the cantilever; and (v) a photodetector coupled to the control circuitry. The system also includes a pulse generator coupled to a light source configured to illuminate the sample and a timing component configured to trigger the pulse generator.

In yet another embodiment, the present invention is a method for measuring the time-evolution of charge or polarization induced by light in a sample. The method comprises the steps of: (i) providing an AFM in operating condition including a light source for illumination of a sample and a voltage source; (ii) obtaining a reference measurement of at least one of an amplitude, a frequency, and a phase of a cantilever of the operating AFM; (iii) applying a $\Delta V$ between the cantilever and the sample and illuminating the sample with the light source; and (iv) determining at least one of a change in the cantilever amplitude or phase versus the duration of the voltage pulse, the duration of the light pulse, or the relative time delay between such pulses resulting from the applied $\Delta V$ and sample illumination.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

FIG. 2D is a graph of the frequency ($\delta f$) and phase ($\delta \phi$) of the cantilever of FIG. 2A due to photocapacitive charging of the sample over time after the light pulse is turned on;

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

The present invention is a system and method for improving the time resolution of electric force microscopy, enabling rapid acquisition of photocapacitance transients in solar-cell films. The present invention is "phase-kick" electric force microscopy (pk-EFM) used to measure the photocapacitance charging rate. In one embodiment, the pk-EFM is sensitive the same underlying photocapacitance dynamics as tr-EFM. However, the pk-EFM method employs an indirect, non-linear detection protocol, which enables reconstruction of the full photocapacitance transient while sidestepping detector-noise and demodulator-bandwidth limitations to the achievable time resolution, as will be described in detail below.

Figure 1:
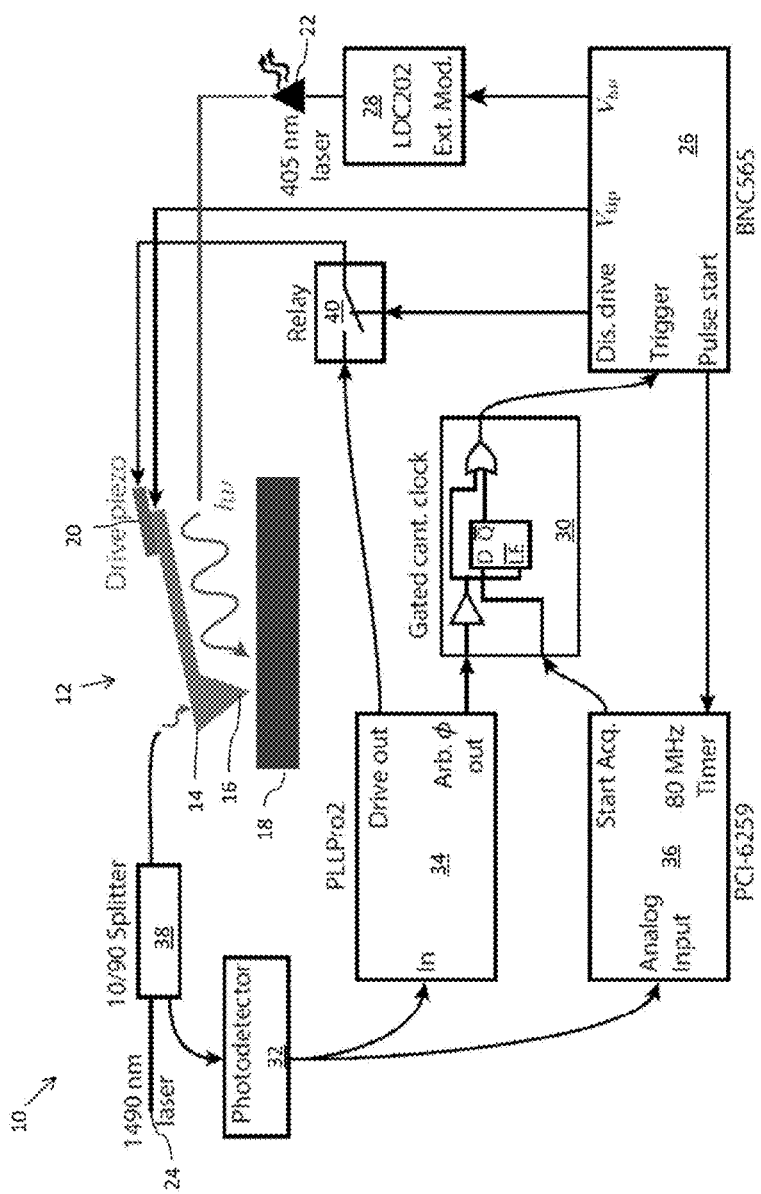
FIG. 1 is a block diagram of an illustrative embodiment of the system for measuring photocapacitance using scanned probe microscopy.

Referring now to FIG. 1, there is shown a block diagram of an illustrative embodiment of the system 10 for measuring photocapacitance using scanned probe microscopy. In the depicted embodiment, the system 10 comprises an atomic force microscope (AFM) 12 having a cantilever 14 with a sharp tip 16. At least the tip 16 of the cantilever 14 is positioned above a sample 18 to be measured by the AFM 12. Not shown, the end of the cantilever 14 distal the tip 16 may be removably fixed or permanently fixed to a support structure. As with conventional AFMs, the AFM 12 in FIG. 1 comprises a drive mechanism, a piezoelectric element 20 for oscillating, driving or otherwise controlling movement of the cantilever 14. In one embodiment, the piezoelectric element 20 is a drive that oscillates the cantilever 14 at one of its eigenfrequencies. In some embodiments, the piezoelectric element 20 is composed of ceramic material; however, any other suitable material may be used.

Still referring to FIG. 1, the system 10 further comprises a first laser 22, a second laser 24, and a pulse generator 26. The first laser 22 is a light source directed toward the tip 16 of the cantilever 14 and provides the pulsed light required for pk-EFM. In the depicted embodiment, the first laser 22 emits light at 405 nm. The first laser 22 is controlled by a conventional controller 28, such as a laser diode current controller. The second laser 24 is a conventional laser of a standard AFM 12 and is also directed toward the tip 16 of the cantilever 14 in order to measure its position or deflection. In the depicted embodiment, the second laser 24 emits light at 1490 nm. In one embodiment, the system 10 further comprises a splitter 38 between the second laser 24 and the cantilever 14. In the depicted embodiment, the splitter 38 is a 10/90 splitter, which decreases the amount of light back-reflected into the second laser 24 in order to increase laser stability and decrease laser noise.

The pulse generator 26 is a voltage source of the system 10 and provides a voltage to the controller 28 of the first laser 22 to initiate the emission of light pulses therefrom. The pulse generator 26 also provides a charge to the cantilever 14. Thus, the pulse generator applies $\Delta V$ between the tip 16 of the cantilever 14 and the sample 18. Charges sent by the pulse generator 26 are controlled by a timing component, such as a gated cantilever clock 30. At programmable time intervals, the gated cantilever clock 30 triggers the pulse generator 26 to send a charge to the first laser 22 or the cantilever 14, as shown in FIG. 1.

As also shown in FIG. 1, the AFM 12 further comprises a photodetector 32 for detecting deflection and motion of the cantilever 14. The photodetector 32 detects deflection of the cantilever 14 and converts the deflection into a signal. Thus, the intensity of the signal is proportional to the deflection of the cantilever 14. The photodetector 32 then transmits the signal to the control circuitry 34, 36 of the AFM 12. Specifically, the photodetector 32 transmits the signal to a controller 34 of the AFM 12. In the depicted embodiment, the controller 34 is a PLLPro2 controller. The photodetector 32 also transmits the signal to a data acquisition (DAQ) component 36. The DAQ component 36 is any component that measures electrical or physical phenomenon (e.g., voltage, current, or pressure) with a computer. In the depicted embodiment, the DAQ component 36 is a NI PCI-6259 multifunction DAQ. Other suitable DAQ components may be used.

In use, the controller 34 of the AFM 12, transmits a signal to a relay 40 and the gated cantilever clock 30. The gated cantilever clock 30 triggers the pulse generator 26, which also transmits a signal to the relay 40. Upon the receipt of the signal from the relay 40 and the pulse generator 26, the piezoelectric element 20 drives oscillation of the cantilever 14. The pulse generator 26 provides a charge to the first laser 22 (via its controller 28) and to the cantilever 14 itself. The first laser 22 then emits light pulses at the tip 16 of the cantilever 14. As the light pulses are transmitted from the pulse generator 26, the pulse generator 26 submits data to the DAQ component 36, which initiates a timer. In the depicted embodiment, the timer is an 80 MHz timer.

Then, the second laser 24 emits light at the tip 16 of the cantilever 14. Deflection and motion of the cantilever 14 is detected by the photodetector 32. Data representing the deflection and motion captured by the photodetector 32 is transmitted to the controller 34 of the AFM 12 and the DAQ component 36. Upon the termination of each programmed time interval, the gated cantilever clock 30 no longer triggers the pulse generator 26.

Figure 2B:
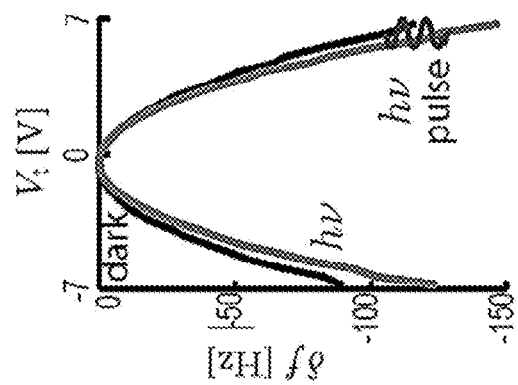
FIG. 2B is a graph of the frequency shift ($\delta f$) versus the tip voltage ($V_t$) of the cantilever of FIG. 2A under illumination.
Figure 2A:
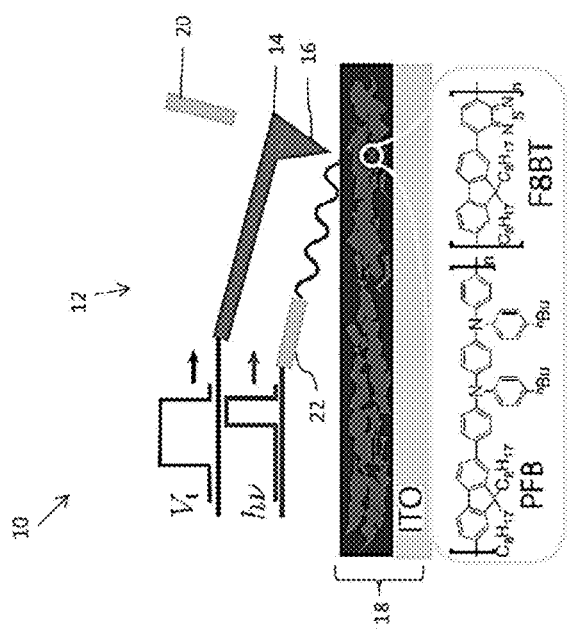
FIG. 2A is a schematic representation of another illustrative embodiment of the system for measuring photocapacitance.

Turning now to FIG. 2A, there is shown a schematic representation of another illustrative embodiment of system 10. In the depicted embodiment, the sample 18 is a spin-coated PFB:F8BT film is on indium tin oxide (ITO). In the depicted embodiment, the distance from the tip 16 to the sample 18 is 250 nm (h=250 nm). In order to measure the time evolution of the photocapacitance of the sample in FIG. 2A, the voltage of the tip 16 is fixed at 10 V ($V_t$=10 V). Thus, the pulse generator 26 (in FIG. 1) applies 10 V to the tip 16 of the cantilever 14. The first laser 22 emits pulsed light at the sample 18, wherein the light has a known energy (hv). The resulting increased cantilever 14 frequency shift ($\delta f$) versus the tip 16 voltage ($V_t$) parabola under illumination is shown in FIG. 2B. The parabola's curvature reflects the increased tip-sample capacitance.

Figure 2C:
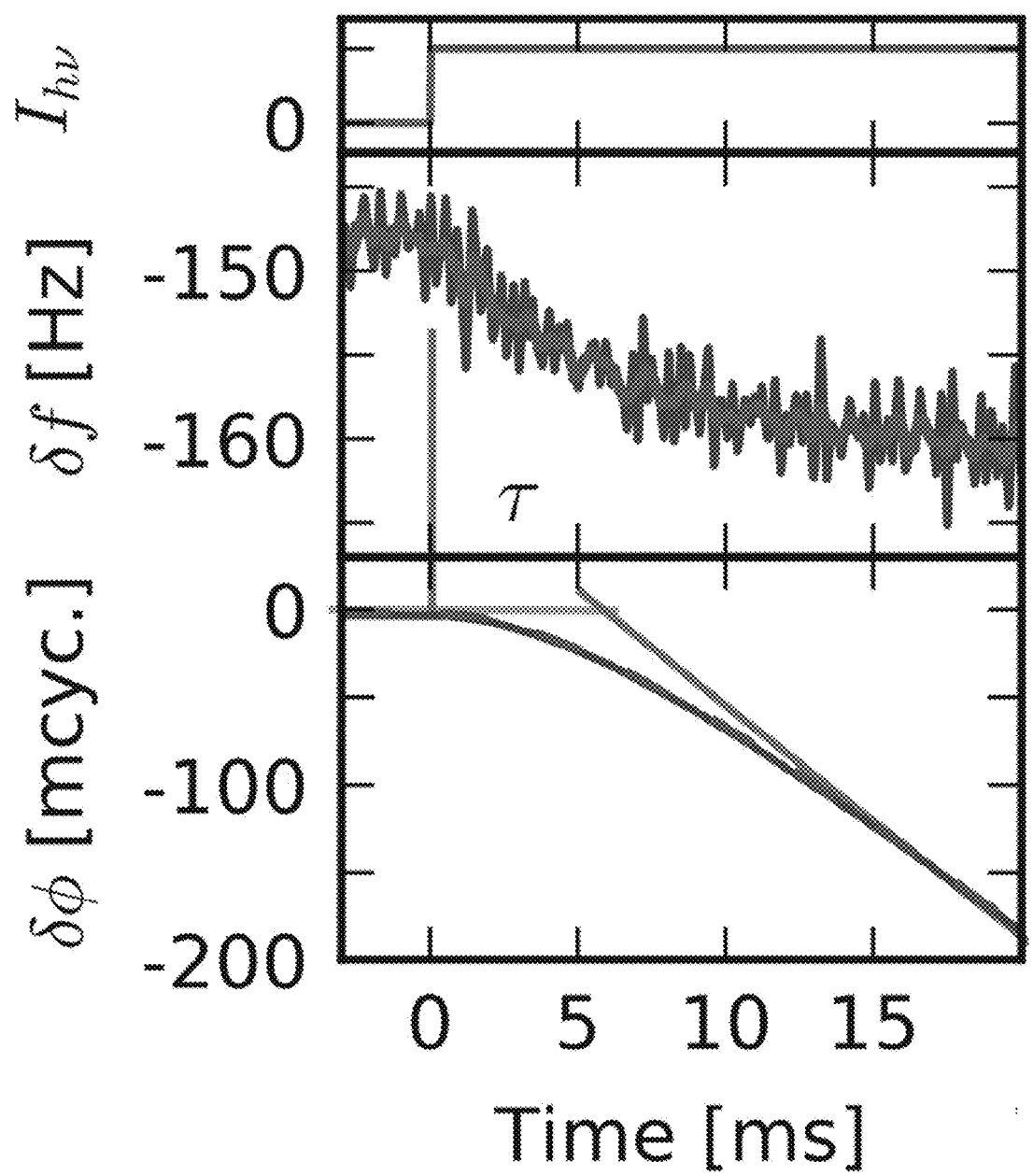
FIG. 2C is a graph of the of the frequency ($\delta f$) and phase ($\delta \phi$) of the cantilever of FIG. 2A over time after the light pulse is turned off.
Figure 2D:
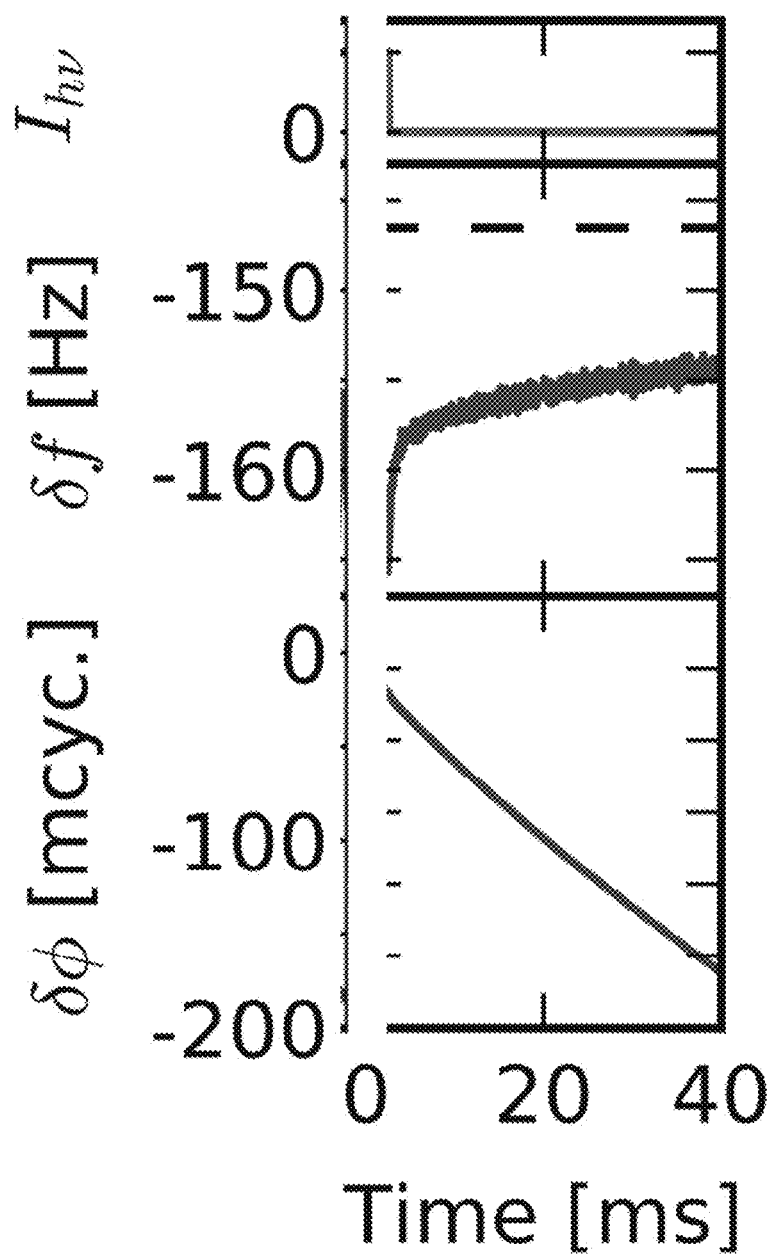

Referring now to FIGS. 2C-2D, there are shown graphs of the photocapacitance measured via the cantilever 14 frequency and phase over time. Specifically, FIG. 2C shows the photocapacitance charging while the light pulse from the first laser 22 is on. In the depicted embodiment, the light intensity ($I_{hv}$) is 0.1 kW m$^{-2}$ in FIG. 2C. (The data in FIG. 2C is demodulated with 3 dB bandwidth 1.92 kHz and 0.96 kHz). FIG. 2D shows the cantilever 14 frequency and phase over time after the light pulse is turned off. When the light ($I_{hv}$=20 kW m$^{-2}$) from the first laser 22 is turned off, but the voltage from the pulse generator 26 remains, light-induced capacitance remains elevated for tens of seconds to minutes, as shown in FIG. 2D. The dashed line in FIG. 2D shows the frequency shift before the start of the light pulse. In the depicted embodiment, an average of 100 traces are shown, each demodulated with 3 dB bandwidth 1.92 kHz.

Figure 3A:
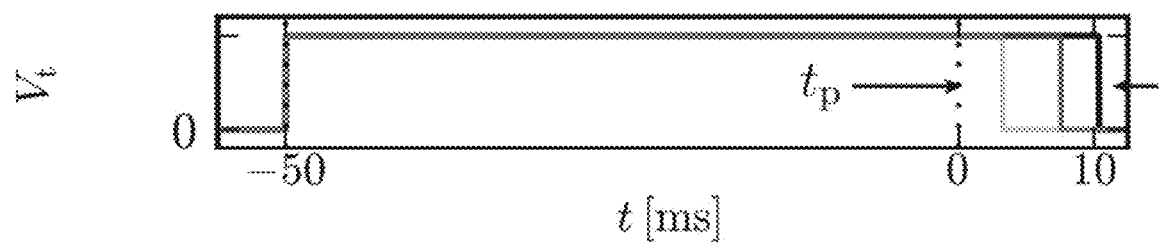
FIG. 3A is a graph of a finite-length voltage pulse ($V_t$) applied to the tip of the cantilever over time.
Figure 3B:
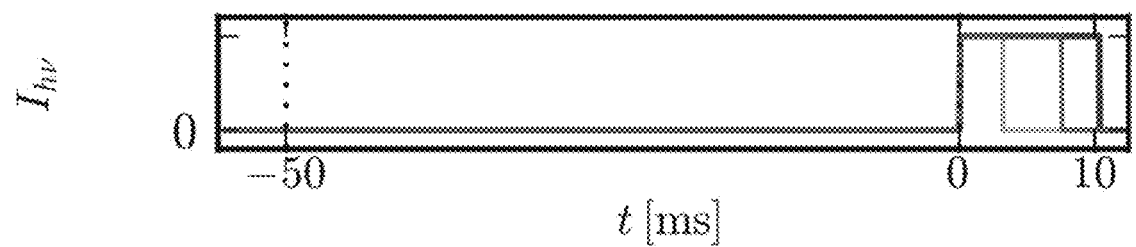
FIG. 3B is a graph of the light intensity ($I_{hv}$) of the light from the first laser with $t_p$ as the pulse time.

Turning now to FIGS. 3A-3E, there is shown an indirect method for measuring transient photocapacitance according to the system 10 set-up and parameters described and shown in FIGS. 2A-2D above. FIGS. 3A-3E show the data for three different pulse times $t_P$ (PFB:F8BT-on-ITO film), h=250 nm, $V_t$=10 V, $I_{hv}$=0.1 kW m$^{-2}$ with a 4 s delay time between pulses. Referring first to FIG. 3A, a finite-length voltage pulse (from the pulse generator 26) charges the tip 16 of a microcantilever 14. At t=0, a light pulse initiates charge generation in the microcantilever 14. The chart in FIG. 3B shows the light intensity ($I_{hv}$) with $t_P$ as the pulse time.

Figure 3C:
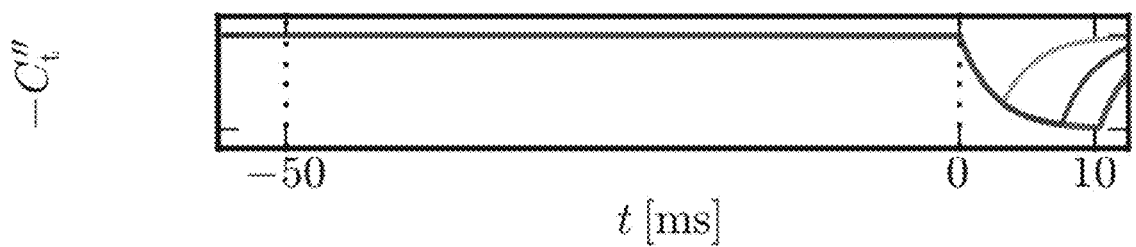
FIG. 3C is a graph of photocapacitance ($C_t''$) of the sample over time.
Figure 3D:
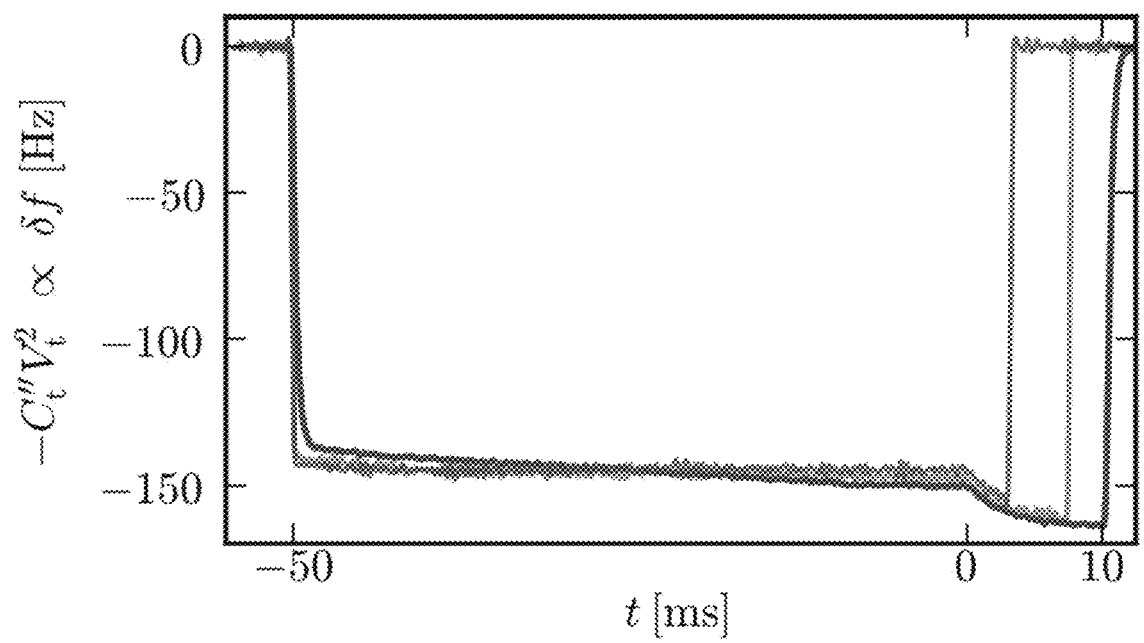
FIG. 3D is a graph of photocapacitance ($C_t''$) of the sample as a change in the cantilever frequency ($\delta f$) over time.
Figure 3E:
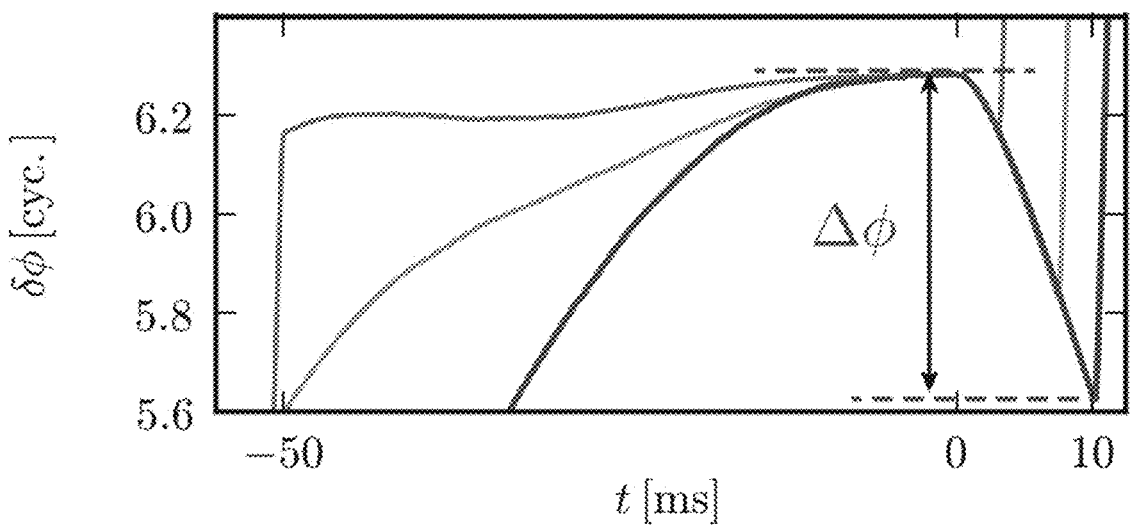
FIG. 3E is a graph of photocapacitance ($C_t''$) of the sample as a change in the phase ($\delta \phi$) over time.

Charge generation in the microcantilever 14 causes a change in the capacitance derivative ($C_t''$). FIG. 3C shows the photocapacitance of the sample 18 (e.g., PFB:F8BT-on-ITO film) as a change in the cantilever frequency ($C_t''V_t^2 \alpha \delta f$) (shown in FIG. 3D) and phase ($\delta \phi$) (shown in FIG. 3E). The resulting change in capacitance induces a small shift in the frequency of oscillation of the microcantilever 14, as shown in FIG. 3D. Finally, the frequency shift concomitantly advances the phase of oscillation of the microcantilever 14, as shown in FIG. 3E. The relative phases ($\delta \phi$) for the three traces in FIG. 3E are aligned at t=0 so they can be easily compared. The voltage- and light-induced phase shift ($\Delta \phi$) is measured as a function of the pulse time $t_P$.

The net phase shift ($\Delta \phi$) is the time integral of the light-induced change in the frequency of the cantilever 14 (or microcantilever). The frequency shift, and hence the phase shift, depend on the product of the sample's 18 capacitance ($C_t''$) and the square of the tip voltage ($V_t^2$). In one embodiment, the photo-induced advance of the phase of the cantilever 14 (or microcantilever) is arrested by abruptly switching the tip voltage (V) to zero according to Equation (1) below.

$$V_t(t) = \begin{cases} V \text{ for } t < t_p \\ 0 \text{ for } t \geq t_p \end{cases} \quad (1)$$

By pulsing the tip voltage ($V_t$), the cantilever 14 is turned into a gated mechanical integrator of the photocapacitance transient. The method can be repeated by stepping the time $t_P$ and plotting the net cantilever phase shift ($\Delta \phi$) versus $t_P$. The measured phase shift is proportional to the integrated photocapacitance transient, according to Equation 2 below.

$$\Delta \phi = \int_0^{t_p} \delta f(t') dt' = -\frac{f_0}{4k_0} V^2 \int_0^{t_p} C_t''(t', hv) dt' \quad (2)$$

The measured phase shift ($\Delta \phi$) versus $t_P$ curve can be fit to obtain sample photocapacitance rise time information.

The system 10 can be used for studying charge carrier generation and recombination at high temporal and spatial resolution in a wide range of photovoltaic films (samples 18). Any other sequence of time-offset light and voltage pulses (e.g., sinusoidal pulses, short duration voltage pulses) that exploit the non-linear relationship between the measured observable (phase shift, amplitude shift, or time-domain amplitude) and the capacitance voltage product may be used with the system 10 according to Equation 3 below.

$$\begin{Bmatrix} \Delta x_{hv}(t \geq t_p) \\ \Delta p_{hv}(t \geq t_p) \end{Bmatrix} \simeq \delta x_{hv} \frac{\omega_0}{1 + \tau^2 \omega_0^2} \left( t_p - \tau + e^{-\frac{t_p}{\tau}} \right) U(t, t_p) \begin{Bmatrix} \tau \omega_0 \\ -m\omega_0 \end{Bmatrix} \quad (3)$$

In an alternative embodiment, for subcycle pulse times, the cantilever phase shift is measured using a lock-in amplifier. In another embodiment, for subcycle pulse times, the cantilever amplitude shift is measured using a lock-in amplifier. In yet another embodiment, for subcycle pulse times, the amplitude of the photocapacitance-induced oscillation is measured in the time-domain.

Unlike TRMC, the system 10 has nanometer-scale spatial resolution and can study materials prepared on electrodes. In organic semiconductor systems, the presence of charge injected by the electrode can dramatically alter organic photovoltaic performance. Unlike tr-EFM and FF-tr-EFM, the system 10 uses an indirect, non-linear detection protocol that evades detector-noise and demodulator-bandwidth limitations to the achievable time resolution. Unlike FF-tr-EFM, the system 10 measures the full photocapacitance transient, not just its rise time. Unlike FF-tr-EFM, pk-EFM is sensitive to arbitrarily fast changes in photocapacitance. The ultimate time resolution is limited only by the ability to modulate the tip voltage, which can be as fast as ps. Unlike ultrafast scanned probe microscopy measurements, the system 10 provides crucially important flexibility to include arbitrary wait times and voltage pulses before or after each measurement. The system 10 obtains reproducible photocapacitance measurements in organic semiconductor samples despite lengthy charge equilibration times.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A method for measuring the time-evolution of charge or polarization induced by light in a sample, comprising the steps of:
    providing an atomic force microscope (AFM) in operating condition including a light source for illumination of a sample, and further including a voltage source;
    obtaining a reference measurement of at least one of an amplitude, a frequency, and a phase of a cantilever of the operating AFM;
    applying, with the voltage source, a ΔV pulse between the cantilever and the sample, and illuminating the sample with a light pulse from the light source;
    determining at least one of a change in the cantilever amplitude or phase by measuring the amplitude or phase after the ΔV pulse; and
    determining the time-evolution of charge or polarization based at least in part on a determined change in the cantilever amplitude or phase, wherein the change in cantilever amplitude or phase is a function of a duration of the ΔV pulse, a duration of the light pulse, or a relative time delay between two or more ΔV pulses or two or more light pulses.

2. The method of claim 1, further comprising triggering a timing component operatively coupled to the AFM.

3. The method of claim 2, wherein the timing component is a gated cantilever clock.

4. The method of claim 2, wherein the step of applying the ΔV pulse between the cantilever and the sample and illuminating the sample with the light pulse occurs for a length of time programmed at the timing component.

5. The method of claim 4, further comprising terminating application of the ΔV pulse between the cantilever and the sample after the length of time.

6. The method of claim 4, further comprising terminating illumination of the sample with the light pulse after the length of time.

7. The method of claim 1, further comprising detecting deflection of the cantilever via a photodetector of the AFM.

8. The method of claim 1, wherein the sample is an organic photovoltaic (OPV) material.

9. The method of claim 1, wherein the time-evolution of sample charge is extracted from measurements of a cantilever phase shift as a function of the duration of the ΔV pulse.

10. The method of claim 1, further comprising varying the duration of the ΔV pulse, the duration of the light pulse, or the relative time delay between two or more ΔV pulses or two or more light pulses.

11. A method for measuring the time-evolution of charge or polarization induced by light in a sample, comprising the steps of:
    providing an atomic force microscope (AFM) in operating condition including a light source for illumination of a sample, and further including a voltage source;
    obtaining a reference measurement of at least one of an amplitude, a frequency, and a phase of a cantilever of the operating AFM;
    applying, with the voltage source, a ΔV pulse between the cantilever and the sample and illuminating the sample with a light pulse from the light source, wherein the light source comprises a first laser configured to emit light pulses at a tip of the cantilever, and further comprises a second laser configured to emit light pulses at the tip of the cantilever; and
    determining at least one of a change in the cantilever amplitude or phase versus: (i) a duration of the ΔV pulse, (ii) a duration of the light pulse, or (iii) a relative time delay between two or more ΔV pulses or two or more light pulses.

12. The method of claim 11, wherein the first laser is configured to emit light at approximately 405 nm, and the second laser is configured to emit light at approximately 1490 nm.

13. The method of claim 11, further comprising a splitter between the second laser and the cantilever.

14. The method of claim 13, wherein the splitter is a 10/90 splitter.

15. A method for measuring the time-evolution of charge or polarization induced by light in a sample, comprising the steps of:
    providing an atomic force microscope (AFM) in operating condition including a light source for illumination of a sample, and further including a voltage source;
    obtaining a reference measurement of at least one of an amplitude, a frequency, and a phase of a cantilever of the operating AFM;
    applying, with the voltage source, a ΔV pulse between the cantilever and the sample and illuminating the sample with a light pulse from the light source;
    determining at least one of a change in the cantilever amplitude or phase versus: (i) a duration of the ΔV pulse, (ii) a duration of the light pulse, or (iii) a relative time delay between two or more ΔV pulses or two or more light pulses; and deriving a photocapacitance measurement of the sample from the determined at least one of a change in the cantilever amplitude or phase versus a duration of the ΔV pulse, a duration of the light pulse, or a relative time delay between two or more ΔV pulses or two or more light pulses.

16. The method of claim 15, wherein the photocapacitance measurement of the sample comprises a sub-microsecond photocapacitance change.

\* \* \* \* \*